United States Patent
Lust et al.

(10) Patent No.: US 12,474,002 B2
(45) Date of Patent: Nov. 18, 2025

(54) MAGNETIC FLUID CONNECTOR

(71) Applicant: Northstar Medical Technologies, LLC, Beloit, WI (US)

(72) Inventors: Dorian Lust, Columbus, WI (US); Kirsten Brokish, Poynette, WI (US)

(73) Assignee: Northstar Medical Technologies LLC, Beloit, WI (US)

( * ) Notice: Subject to any disclaimer, the term of this patent is extended or adjusted under 35 U.S.C. 154(b) by 0 days.

(21) Appl. No.: 19/019,058

(22) Filed: Jan. 13, 2025

(65) Prior Publication Data
US 2025/0155061 A1 May 15, 2025

Related U.S. Application Data

(62) Division of application No. 18/223,419, filed on Jul. 18, 2023.

(60) Provisional application No. 63/440,218, filed on Jan. 20, 2023, provisional application No. 63/390,716, filed on Jul. 20, 2022, provisional application No. 63/368,822, filed on Jul. 19, 2022.

(51) Int. Cl.
*F16L 55/115* (2006.01)
*F16L 37/00* (2006.01)

(52) U.S. Cl.
CPC ............ *F16L 37/004* (2013.01); *F16L 55/115* (2013.01)

(58) Field of Classification Search
CPC ....... F16L 37/004; F16L 55/115; A61M 39/20
See application file for complete search history.

(56) References Cited

U.S. PATENT DOCUMENTS

| | | | | |
|---|---|---|---|---|
| 2,548,934 A | * | 4/1951 | Beaird | F16J 13/065 |
| | | | | 220/378 |
| 2,793,057 A | * | 5/1957 | Mcgugin | F16L 37/004 |
| | | | | 285/918 |
| 3,181,895 A | | 5/1965 | Cator | |

(Continued)

FOREIGN PATENT DOCUMENTS

| | | | |
|---|---|---|---|
| CN | 208319701 U | 1/2019 | |
| WO | 2010040478 A1 | 4/2010 | |
| WO | 2016020670 A2 | 2/2016 | |
| WO | WO-2018094202 A1 * | 5/2018 | ............. A62B 18/04 |
| WO | WO-2019193521 A1 * | 10/2019 | ............. F16J 13/065 |

OTHER PUBLICATIONS

McAlister, D.R et al, "Automated Two Column Generator Systems for Medical Radionuclides," Applied Radiation and Isotopes, vol. 67, issue 11, pp. 1985-1991, Nov. 2009. https://doi.org/10.1016/j.apradiso.2009.07.019.

(Continued)

*Primary Examiner* — Zachary T Dragicevich
*Assistant Examiner* — James A Linford
(74) *Attorney, Agent, or Firm* — Husch Blackwell LLP

(57) ABSTRACT

A fluid connector can include a first connector having a first passageway and a second passageway; and a second connector having a third passageway and a fourth passageway. The first connector can be attracted to the second connector through a magnetic force, thereby forming the fluid connector. Moreover, when the first connector abuts the second connector, the first passageway together with the third passageway can form a first fluid path, and the second passageway together with the fourth passageway can form a second fluid path that is different from the first fluid path.

6 Claims, 13 Drawing Sheets

(56) References Cited

U.S. PATENT DOCUMENTS

| | | | |
|---|---|---|---|
| 3,993,102 A * | 11/1976 | Polster | F16L 55/115 |
| | | | 138/96 T |
| 5,110,474 A | 5/1992 | Horwitz et al. | |
| 5,540,265 A | 7/1996 | Polaschegg et al. | |
| 5,603,834 A | 2/1997 | Rogers et al. | |
| 5,707,525 A | 1/1998 | Rogers et al. | |
| 5,854,968 A | 12/1998 | Horwitz et al. | |
| 5,863,439 A | 1/1999 | Dietz et al. | |
| 5,888,397 A | 3/1999 | Rogers et al. | |
| 6,511,603 B1 | 1/2003 | Dietz et al. | |
| 6,852,296 B2 | 2/2005 | Bond et al. | |
| 7,157,022 B2 | 1/2007 | Horwitz et al. | |
| 7,553,461 B2 | 6/2009 | Horwitz et al. | |
| 9,299,466 B2 | 3/2016 | Isensee et al. | |
| 9,336,912 B2 | 5/2016 | Isensee | |
| 2011/0084474 A1 | 4/2011 | Paden et al. | |
| 2011/0288534 A1 | 11/2011 | Aguirre et al. | |
| 2012/0319313 A1 * | 12/2012 | Davis | F16L 55/115 |
| | | | 261/119.1 |
| 2014/0191501 A1 * | 7/2014 | Brugger | F16L 35/00 |
| | | | 285/120.1 |
| 2015/0165341 A1 | 6/2015 | Isensee | |
| 2022/0178477 A1 | 6/2022 | Brugger et al. | |
| 2023/0039396 A1 * | 2/2023 | Stahl | A42B 1/245 |
| 2024/0082527 A1 | 3/2024 | Stahl | |
| 2024/0318755 A1 * | 9/2024 | Boulard | F16L 37/08 |
| 2024/0416077 A1 | 12/2024 | Andersen et al. | |
| 2025/0177720 A1 * | 6/2025 | Sullivan | A61M 25/0029 |

OTHER PUBLICATIONS

Gula, M. et al, "Separation, Concentration, and Immobilization of Technetium and Iodine from Alkaline Supernate Waste," Final Report by Eichrom Industries, Inc. for U.S. Department of Energy, Office of Fossil Energy, Federal Energy Technology, Center, Morgantown, West Virginia, Dec. 7, 1998 (100 pages).

Bond, A.H. et al, "Design, Synthesis, and Uptake Performance of ABEC Resins for the Removal of Pertechnetate from Alkaline Radioactive Wastes," Ind. Eng. Chem. Res. 1999, 38, 4, pp. 1676-1682. https://doi.org/10.1021/ie980072n.

Bond, A.H. et al, "Flowsheet Feasibility Studies Using ABEC Resins for Removal of Pertechnetate from Nuclear Wastes," Ind. Eng. Chem. Res. 1999, 38, 4, pp. 1683-1689. https://doi.org/10.1021/ie980611o.

Argyrou, M. et al, "Rhenium-188 Production in Hospitals, by w-188/re-188 Generator, for Easy Use in Radionuclide Therapy," Int J Mol Imaging. 2013; 2013:290750. doi: 10.1155/2013/290750.

Horwitz, E.P. et al, "A Lead-Selective Extraction Chromatographic Resin and its Application to the Isolation of Lead from Geological Samples," Analytica Chimica Acta, vol. 292, issue 3, Jul. 11, 1994, pp. 263-273. https://doi.org/10.1016/0003-2670(94)00068-9.

International Search Report, re Application No. PCT/US2023/028061, mailed Jan. 23, 2024.

Written Opinion, re Application No. PCT/US2023/028061, mailed Jan. 23, 2024.

International Preliminary Report on Patentability, re Application No. PCT/US2023/028061, mailed Dec. 18, 2024.

* cited by examiner

MAGNETIC FLUID CONNECTOR

CROSS-REFERENCE TO RELATED APPLICATION

This application is a divisional of U.S. Ser. No. 18/223,419 filed on Jul. 18, 2023 which claims the benefit of the filing date of U.S. provisional application Ser. No. 63/368,822, filed Jul. 19, 2022, entitled, "Two-Path Magnetic Fluid Connector" and U.S. provisional application Ser. No. 63/390,716, filed Jul. 20, 2022, entitled, "Two-Path Magnetic Fluid Connector", and U.S. provisional application Ser. No. 63/440,218, filed Jan. 20, 2023, entitled, "Source Vessel Capping Mechanism", all of which are hereby incorporated by reference as if fully set forth herein.

TECHNICAL FIELD

This disclosure generally relates to fluid connectors. More specifically, the subject disclosure relates to a fluid connector that utilizes one or more magnets to assemble the fluid connector. This disclosure further relates to a capping mechanism for a source vessel, and more particularly, a dual capping mechanism for such source vessels that utilizes a primary and a secondary cap.

BACKGROUND

Fluid connectors typically require forming a threaded connection between two components. Threading two components together can be time-consuming. Thus, there is a need for a fluid connector that can be assembled quickly and in a time-efficient manner.

Moreover, a threaded connection generally requires a user to rotate one component against another component. Depending on a size of the components, a certain amount of torque can be required to form a sealed connection, making assembling a fluid connector a difficult task for some users. Thus, there is also a need for a fluid connector that can easily be assembled without being overtly physically demanding on its users.

Furthermore, a typical fluid connector utilizing a threaded connection requires a user to be proximal to the connector in order to assemble the fluid connector, which can be impractical due to environmental hazards, such as temperature, pressure, or radiation. Thus, there is a further need for a fluid connector that can be assembled remotely, or without requiring a user to be in direct physical contact in order to assemble the fluid connector.

Moreover, source vessels containing radioactive materials are required to meet U.S. Department of Transportation Type A shipping requirements. The fluid connectors for such vessels are also required to meet these shipping requirements, which include primary and secondary closures.

Typically, the primary closure and the secondary closure are provided in the form of a first cap and a separate second cap, respectively. Installing two separate caps can require multiple steps and be time-consuming. There is also more interaction time between users and the source vessel which results in more chances for exposure and for error. Thus, there is a need for a fluid connector dual capping mechanism that can include both a primary and a secondary closure that can be installed together in a time-efficient manner.

Moreover, removing two separate caps can require additional time and effort, which can be impractical due to environmental hazards such as temperature, pressure, or radiation. Thus, there is also a need for a fluid connector capping mechanism, including both a primary and secondary cap, that can be easily removed without having to individually remove each of the primary and secondary caps.

BRIEF SUMMARY

Some aspects of this disclosure pertain to a fluid connector. The fluid connector includes a first connector including a first passageway and a second passageway; and a second connector including a third passageway and a fourth passageway, wherein the first connector is attracted to the second connector through a magnetic force, thereby forming the fluid connector, and wherein when the first connector abuts the second connector, the first passageway together with the third passageway form a first fluid path, and the second passageway together with the fourth passageway form a second fluid path that is different from the first fluid path.

Some aspects of this disclosure pertain to the first connector further including a first magnet, and the second connector further includes a second magnet, wherein a side of the first magnet proximal to the second connector has an opposite polarity than a side of the second magnet proximal to the first connector.

Some aspects of this disclosure pertain to the first connector further including a first housing including a base wall and a first side wall that is generally perpendicular with respect to the base wall and protrudes beyond a plane defined by the base wall, defining a receiving cavity therein, wherein the second connector further includes a second housing including a top wall and a second side wall protruding rearwardly therefrom, and wherein the second housing can be received within the receiving cavity.

Some aspects of this disclosure pertain to the first housing further including a first transition portion between the base wall and the first side wall, wherein the first transition portion is configured to guide the second connector into proper alignment with the first connector Some aspects of this disclosure pertain to the first housing further including a first outer wall and a first inner wall each protruding in a direction opposite from the first side wall, wherein the first inner wall is provided proximal to a center portion of the base wall, and the outer wall is provided distal from the center portion of the base wall.

Some aspects of this disclosure pertain to a first magnet is provided between the first outer wall and the first inner wall.

Some aspects of this disclosure pertain to the first inner wall further defines a first tube for receiving a first coupling, the first tube being concentric with the first passageway.

Some aspects of this disclosure pertain to the first passageway is provided through the base wall proximal to a central axis through the first connector, and wherein the third passageway is provided through the top wall proximal to a central axis through the second connector.

Some aspects of this disclosure pertain to the second passageway is provided through the base wall and a portion of the first inner wall, such that the first tube can be in fluid communication with an external component through the second passageway.

Some aspects of this disclosure pertain to the second housing further including a second transition portion between the top wall and the second side wall, wherein the second transition portion corresponds to the first transition portion of the first connector for guiding the second connector into the receiving cavity.

Some aspects of this disclosure pertain to the second housing further including a second outer wall and a second inner wall, wherein the second outer wall extends from the second side wall, and where the second inner wall protrudes from the top wall proximal to a center portion of the top wall.

Some aspects of this disclosure pertain to a second magnet is provided between the second outer wall and the second inner wall.

Some aspects of this disclosure pertain to the second inner wall further defines a second tube for receiving a second coupling, the second tube being concentric with the third passageway.

Some aspects of this disclosure pertain to the fourth passageway is provided through the top wall and a portion of the second inner wall, such that the second tube can be in fluid communication with an external component through the fourth passageway.

Some aspects of this disclosure pertain to a fluid connector system includes a connector including a first passageway and a second passageway, the connector comprising a first magnet; and a cap for capping the connector, the cap includes an outer cap coupled to an inner cap, wherein the inner cap includes a second magnet, wherein the cap is attracted to the connector through a magnetic force, thereby capping the connector.

Some aspects of this disclosure pertain to the fluid connector system further including a cap removal tool for engaging the cap, the cap removal tool comprising a third magnet.

Some aspects of this disclosure pertain to the cap further including a latch provided between the outer cap and the inner cap, wherein the latch being moveable relative to the inner cap and the outer cap.

Some aspects of this disclosure pertain to the latch is made of a ferrous material, such that the latch is attracted to the cap removal tool when the cap removal tool engages the cap, and the latch is attracted to the inner cap when the cap removal tool is absent.

Some aspects of this disclosure pertain to the outer cap including a catch configured to mate with a notch on the connector, thereby locking the cap onto the connector.

Some aspects of this disclosure pertain to the cap removal tool further including a pin for engaging an aperture of the outer cap.

Figure 1:
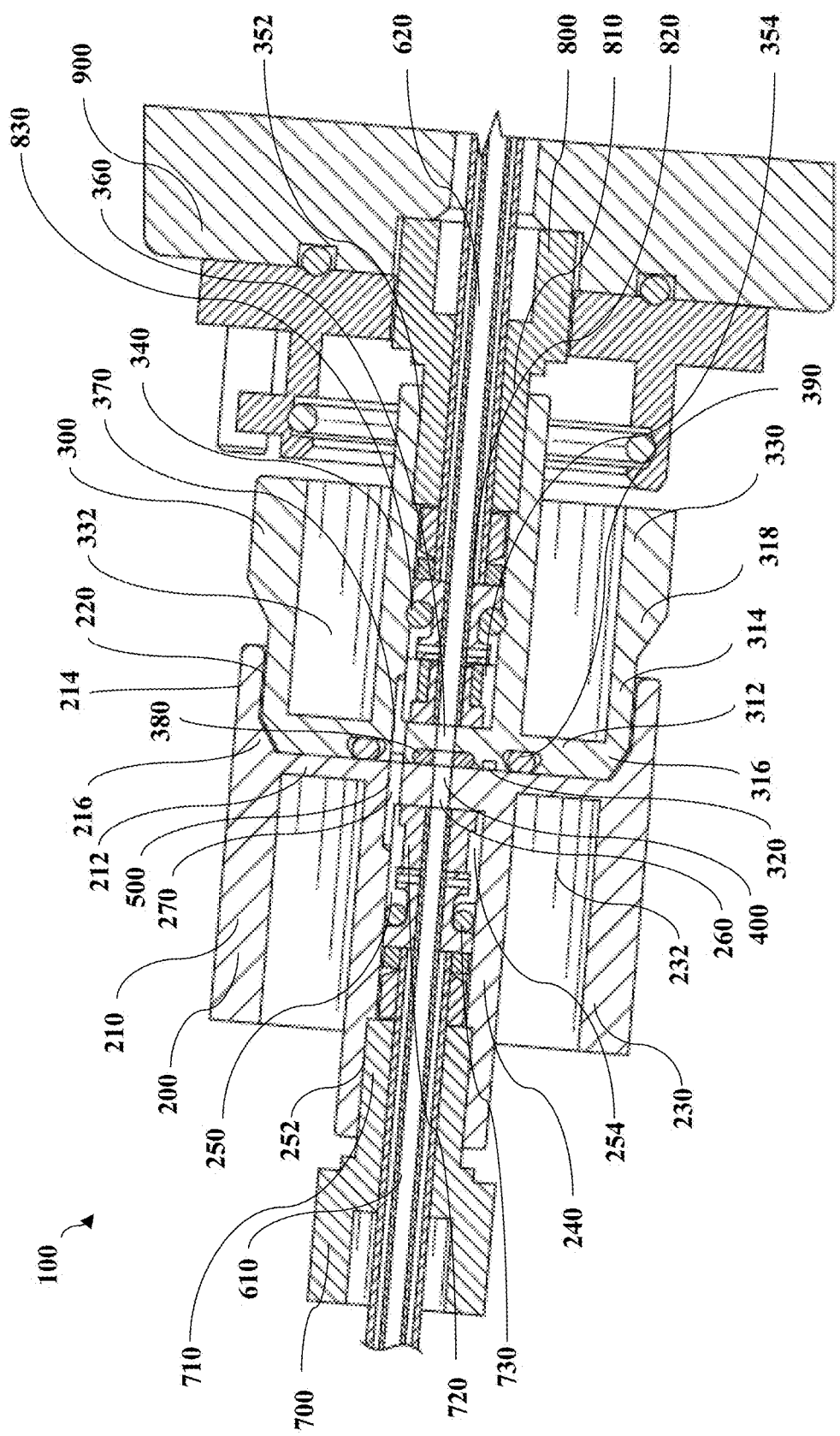
FIG. 1 illustrates a cutaway view of a fluid connector according to an embodiment.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

While this invention is susceptible of embodiments in many different forms, there are shown in the drawings and will be described in detail herein specific embodiments with the understanding that the present disclosure is an exemplification of the principles of the invention. It is not intended to limit the invention to the specific illustrated embodiments. The features of the invention disclosed herein in the description, drawings, and claims can be significant, both individually and in any desired combinations, for the operation of the invention in its various embodiments. Features from one embodiment can be used in other embodiments of the invention.

As shown in FIGS. 1-10, the embodiments of this disclosure include a fluid connector 100. First referring to FIG. 1, the fluid connector 100 can include a first connector 200 and a second connector 300. The first connector 200 and the second connector 300 can be mated to form the fluid connector 100. Unlike a traditional threaded fluid connector, the first connector 200 and the second connector 300 can easily be attached and detached from each other.

The first connector 200 can include a first housing 210. In some embodiments, the first housing 210 can be a component external to the first connector 200 that can be coupled with the first connector 200. In some embodiments shown in FIG. 1, the first connector 200 can be a "female" connector configured to receive a "male" connector (such as the second connector 300 in some embodiments shown in FIG. 1).

The first housing 210 can include a base wall 212 and a first side wall 214 that protrudes beyond a plane defined by the base wall 212. The first side wall 214 can be generally perpendicular with respect to the base wall 212.

A first transition portion 216 can further be provided between the base wall 212 and the first side wall 214. The first transition portion 216 can be sloped, curved, or in other suitable geometrical shapes. The first transition portion 216 can serve to guide the second connector 300 into proper alignment with the first connector 200. In some embodiments, the first transition portion 216 can be omitted. The base wall 212, the first side wall 214, and the first transition portion 216 (if not omitted) can together define a receiving cavity 220 for receiving the corresponding male connector.

The first housing 210 can further include a first outer wall 230 and a first inner wall 240. The first outer wall 230 can protrude from the base wall 212 in a direction opposite from the first side wall 214. The first outer wall 230 together with the first base wall 212 can form an outer shell for the first housing 210.

The first inner wall 240 can protrude from the base wall 212 proximal to a center portion of the base wall 212. The first inner wall 240 can protrude in a direction opposite from the first side wall 214, and generally parallel with the first outer wall 230. A first magnet 232 can be provided between the first outer wall 230 and the first inner wall 240. The first magnet 232 can have a positive polarity end and a negative polarity end. In an embodiment, the positive polarity end of the first magnet 232 can be proximal to the base wall 212. In alternative embodiments, the negative polarity end of the first magnet 232 can be proximal to the base wall 212. In some embodiments, more than one magnet can be provided within the first connector 200.

The first inner wall 240 can further define a first tube 250 within the first connector 200. The first tube 250 can include a first outer tube 252 and a first inner tube 254. The first outer tube 252 and the first inner tube 254 can have different diameters.

In some embodiments, a first threaded coupling 700 can be coupled to the first connector 200 by being inserted into the first tube 250. The first threaded coupling 700 can include a first compression fitting 710 for the first outer tube 252, a second compression fitting 720 for the first inner tube 254, and a first coupling seal 730 (such as an O-ring) that can seal an inner diameter of the first inner wall 240. The first coupling seal 730 can further function as a spacer coupling sandwiched between the first compression fitting 710 and the second compression fitting 720. A flow path can be provided in a diameter (such as the inner diameter) of the seal to allow venting, such as to vent fluid to the outer tube.

A first passageway 260 can be provided through the base wall 212 such that the first tube 250 and/or one or more components therein can be in fluid communication with an external component (such as the second connector 300), or with an external environment. The first passageway 260 can be provided proximal to a central axis through the first connector 200.

A second passageway 270 can be provided through the base wall 212. In some embodiments shown in FIG. 1, the second passageway 270 can be provided through both the base wall 212 and a portion of the first inner wall 240 such that the first tube 250 and/or one or more components therein can be in fluid communication with an external component (such as the second connector 300), or with an external environment. The second passageway 270 can serve as a vent for venting air and/or fluid.

The second connector 300 can include a second housing 310. In some embodiments, the second housing 310 can be a component external to the second connector 300 that can be coupled with the second connector 300. In some embodiments shown in FIG. 1, the second connector 300 can be a "male" connector configured to be received by a "female" connector (such as the first connector 200 in some embodiments shown in FIG. 1).

The second housing 310 can include a top wall 312 and a second side wall 314 that protrudes rearwardly from the top wall 312. The second side wall 314 can be generally perpendicular with respect to the top wall 312.

A second transition portion 316 can further be provided between the top wall 312 and the second side wall 314. The second transition portion 316 can be sloped, curved, or in other suitable geometrical shapes. In particular, the second transition portion 316 can be in a shape that generally compliments the shape of the first transition portion 216 such that the first transition portion 216 and the second transition portion 316 can together serve to guide the second connector 300 into proper alignment with the first connector 200. In some embodiments, the second transition portion 316 can be omitted. The top wall 312, the second side wall 314, and the second transition portion 316 (if not omitted) can together define a protruding profile that can be received in the receiving cavity 220 of the first connector 200.

The second side wall 314 (or a portion thereof) and the top wall 312 can be received in the receiving cavity 220, resulting in portions of the first side wall 214 overlapping with portions of the second side wall 314. Due to the use of magnetic forces, the base wall 212 and the top wall 312 can snap together instead of being slowly threaded together, possibly resulting in liquid being splashed out. Thus, the concentric configuration of the first side wall 214 and the second side wall 314 can serve to prevent the splashing of any radioactive or caustic fluid when the base wall 212 and the top wall 312 come together. Moreover, utilizing the second transition portion 316 to form a chamfer surface on a leading edge of the second connector 200 can also ensure that the first connector 200 and the second connector 300 can come together without binding, which can prevent full insertion.

The second housing 310 can further include a second outer wall 330 and a second inner wall 340. The second outer wall 330 can be an extension of the second side wall 314. The second housing 310 can also include a third transition portion 318 between the second side wall 314 and the second outer wall 330 that can serve to further align the first connector 200 and the second connector 300 and/or to increase the strength of the second housing 310. In some embodiments, the third transition portion 318 can be omitted. The second outer wall 330, the second side wall 312, and the third transition portion 318 (if not omitted) can form an outer shell for the second housing 310.

The second inner wall 340 can protrude from the top wall 312 proximal to a center portion of the top wall 312. The second inner wall 340 can be generally parallel with the second outer wall 330. A second magnet 332 can be provided between the second outer wall 330 and the second inner wall 340. The second magnet 332 can have a positive polarity end and a negative polarity end. In an embodiment where the positive polarity end of the first magnet 232 is proximal to the base wall 212, the negative polarity end of the second magnet 332 can be proximal to the top wall 312. In such embodiment, because the positive polarity end of the first magnet 232 is proximal to the base wall 212 and the negative polarity end of the second magnet 332 is proximal to the top wall 312, the first connector 200 and the second connector 300 can be attracted toward each other when the two components are in a close physical proximity from one another. In alternative embodiments where the negative polarity end of the first magnet 232 is proximal to the base wall 212, the positive polarity end of the second magnet 332 can be proximal to the top wall 312. In some embodiments, more than one magnet can be provided within the second connector 300. Likewise, the first connector 200, the second connector 300, or both can be made out of a magnetic material, such as a ferromagnetic material or a paramagnetic material.

Through the use of the magnets, the first connector 200 and the second connector 300 can be attracted toward each other, thereby forming the fluid connector 100. Put differently, once physically proximal to one another, the first connector 200 and the second connector 300 can self-align and connect via magnetic force. Thus, the fluid connector 100 can be advantageous over threaded connectors in various ways, such as substantially improving the speed of connection, improving the ease of connection by removing user-dependent steps such as thread fastening, and requiring simpler motions to assembly and disassemble, which may be beneficial for automation.

The second inner wall 340 can further define a second tube 350 within the second connector 300. The second tube 350 can include a second outer tube 352 and a second inner tube 354. The second outer tube 352 and the second inner tube 354 can have different diameters.

In some embodiments, a second threaded coupling 800 can be coupled to the second connector 300 by being inserted into the second tube 350. The second threaded coupling 800 can include a third compression fitting 810 for the second outer tube 352, a fourth compression fitting 820 for the second inner tube 354, a second coupling seal 830 (such as an O-ring) that can seal an inner diameter of the second inner wall 340. The second coupling seal 830 can further function as a spacer coupling sandwiched between the third compression fitting 810 and the fourth compression fitting 820. A flow path can be provided in a diameter (such as the inner diameter) of the seal to allow venting, such as to vent fluid to the outer tube.

A third passageway 360 can be provided through the top wall 312 such that the second tube 350 and/or one or more components therein can be in fluid communication with an external component (such as the first connector 200), or with an external environment. The third passageway 360 can be provided proximal to a central axis through the second connector 300. Specifically, a location where the third passageway 360 is provided on the top wall 312 can correspond with a location where the first passageway 260 is provided on the bottom wall 212, such that when the first connector 200 and the second connector 300 are mated together, the first passageway 260 is in fluid communication with the third passageway 360, forming a first fluid path 400. In some embodiments shown in FIG. 1, the second connector 300 can further be coupled to a source vessel 900.

A fourth passageway 370 can be provided through the top wall 312. In some embodiments shown in FIG. 1, the fourth passageway 370 can be provided through both the top wall 312 and a portion of the second inner wall 340 such that the second tube 350 and/or one or more components therein can be in fluid communication with an external component (such as the first connector 200), or with an external environment. The fourth passageway 370 can serve as a vent for venting air and/or fluid.

Specifically, a location that the fourth passageway 370 is provided on the top wall 312 can correspond with a location that the second passageway 270 is provided on the bottom wall 212, such that when the first connector 200 and the second connector 300 are mated together, the second passageway 270 is in fluid communication with the fourth passageway 370, forming a second fluid path 500.

In some embodiments shown in FIG. 1, the first fluid path 400 and the second fluid path 500 can be distinct and separate from one another. Such concentric dual-path connection can be useful in applications such as when a fluid is suctioned out through one fluid path and replenished through the other fluid path. Although a two-paths fluid connector is described in some embodiments, it should be appreciated that a fluid connector can include one or more fluid paths by applying similar principals described herein and are within the spirit of this disclosure.

When the first connector 200 is mated with the second connector 300, the bottom surface 212 and the top surface 312 can form a hermetic seal that forces fluids to travel through either the first fluid path 400 and/or the second fluid path 500 and also prevent leakage to outside the fluid connector 100.

In some embodiments as shown in FIG. 1, an inner seal 380 and an outer seal 390 can be provided on the second connector 300. The inner seal 380 can be an O-ring surrounding the third passageway 360. The inner seal 380 can serve to isolate the first fluid path 400 from the second fluid path 500. The outer seal 390 can be an O-ring surrounding the fourth passageway 370. The outer seal 390 can serve to isolate the first fluid path 400 and the second fluid path 500 from the ambient environment. Although the inner seal 380 and the outer seal 390 are shown in some embodiments as shown in FIG. 1 as being provided on the second connector 300, it can be appreciated that, alternatively or additionally, seals can be provided on the first connector to serve similar functions and thus are within the spirit of this disclosure. Further, a size and number of the inner seal 380 and of the outer seal 390, as well as a thickness of the base wall 212 and/or the top wall 312 can vary depending on a compression force asserted by the first magnet 232 and the second magnet 332.

A first conduit 610 (such as a hose or a pipe) can be provided in the first connector 200 such that an end of the first conduit 610 abuts the bottom wall 212 on a surface opposite from a surface that comes into contact with the top wall 312. The first conduit 610 can be in fluid communication with the first fluid path 400, but is otherwise sealed off from the second fluid path 500.

Likewise, a second conduit 620 (such as a hose or a pipe) can be provided in the second connector 300 such that an end of the second conduit 620 abuts the top wall 312 on a surface opposite from a surface that comes into contact with the bottom wall 212. The second conduit 620 can be in fluid communication with the first fluid path 400, but is otherwise sealed off from the second fluid path 500. Thus, when the fluid connector 100 is assembled, the first conduit 610 can be in fluid communication with the second conduit 620 through the first flow path 400. Similarly, when the fluid connector 100 is assembled, the first tube 250 can be in fluid communication with the second tube 350 through the second flow path 500. As discussed above, the second flow path 500 can serve as a vent for venting air and/or fluid.

In some embodiments, a switch can be provided with a touch pin (not shown) that can detect if the first connector 200 and the second connector 300 are in contact.

Figure 2:
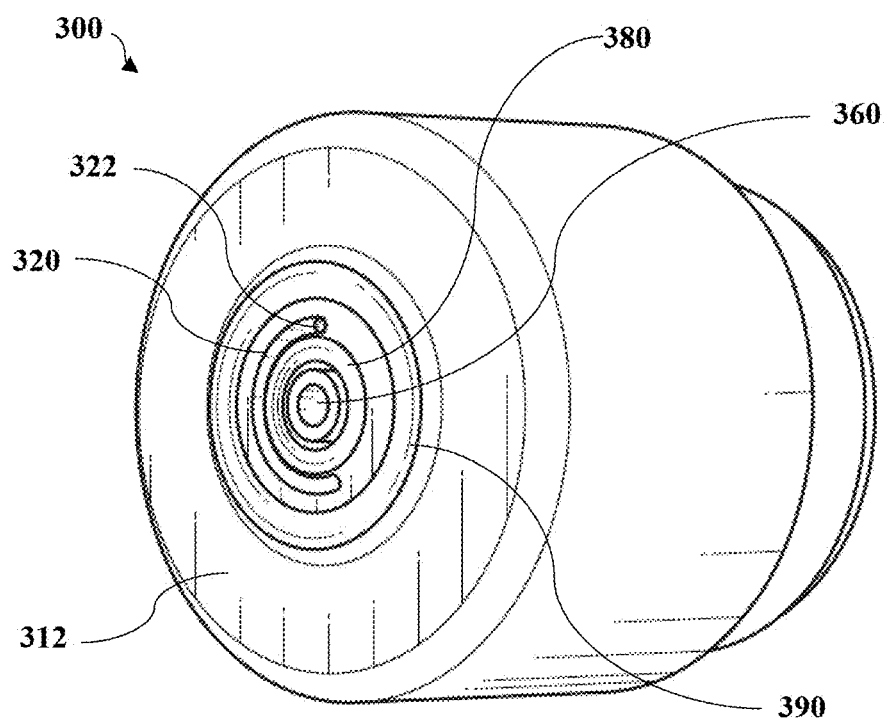
FIG. 2 illustrates a perspective view of a "male" connector of a fluid connector according to an embodiment.

FIG. 2 illustrates a perspective view of a second connector 300 detached from the source vessel 900 according to an embodiment. As shown in the illustrated embodiment, the third passageway 360 can be provided in a center of the top wall 312 and proximal to the central axis through the second connector 300. The third passageway 360 can be surrounded by the inner seal 380. The outer seal 390 can further surround the inner seal 380, with a groove 320 being provided on a portion of the top wall 312 between the inner seal 380 and the outer seal 390. The third passageway 360, the inner seal 380, and the outer seal 390 can be arranged in concentric circles with a common axis, which can be the central axis through the second connector 300. Though in other embodiments, the third passageway 360, the inner seal 380, and the outer seal 390 can be arranged in other arrangements that are not concentric circles.

Figure 3:
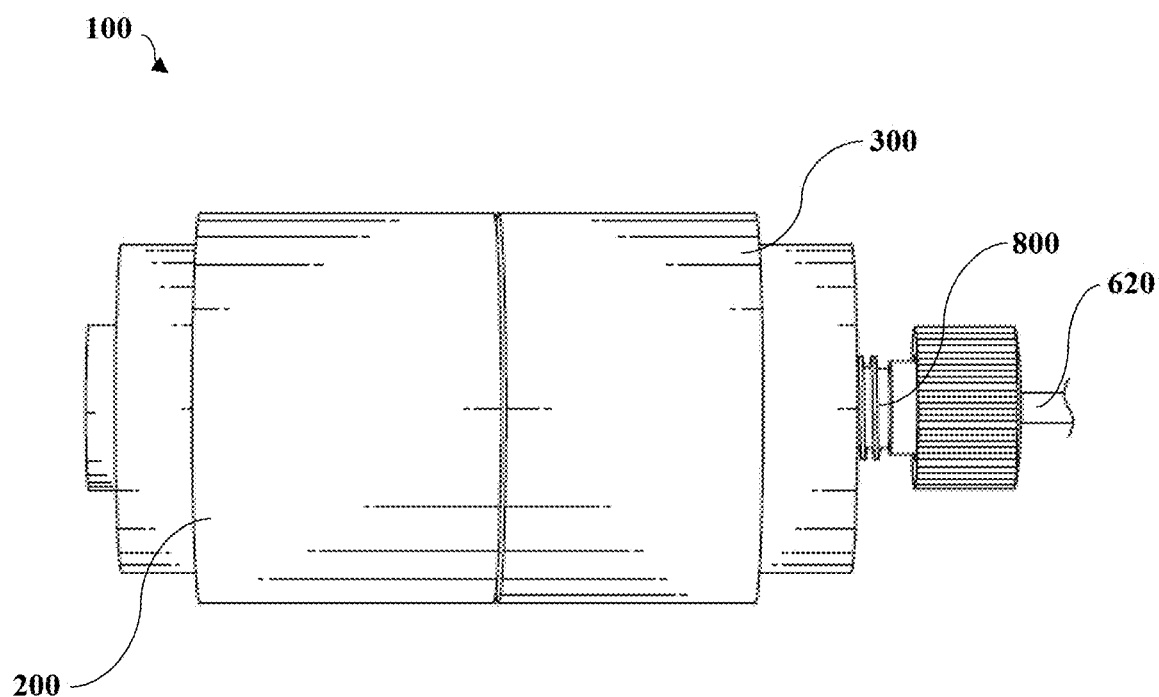
FIG. 3 illustrates a perspective view of a fluid connector according to an embodiment.

FIG. 3 illustrates a perspective view of a fluid connector 100 according to an embodiment. In this illustrated embodiment, the first connector 200 and the second connector 300 can be mated together as previously described (such as via a magnetic force). Furthermore, the second threaded coupling 800 can be inserted into an end of the second connector 300 opposite from the first connector 200. The second conduit 620 can be provided through the second threaded coupling 800.

Figure 4:
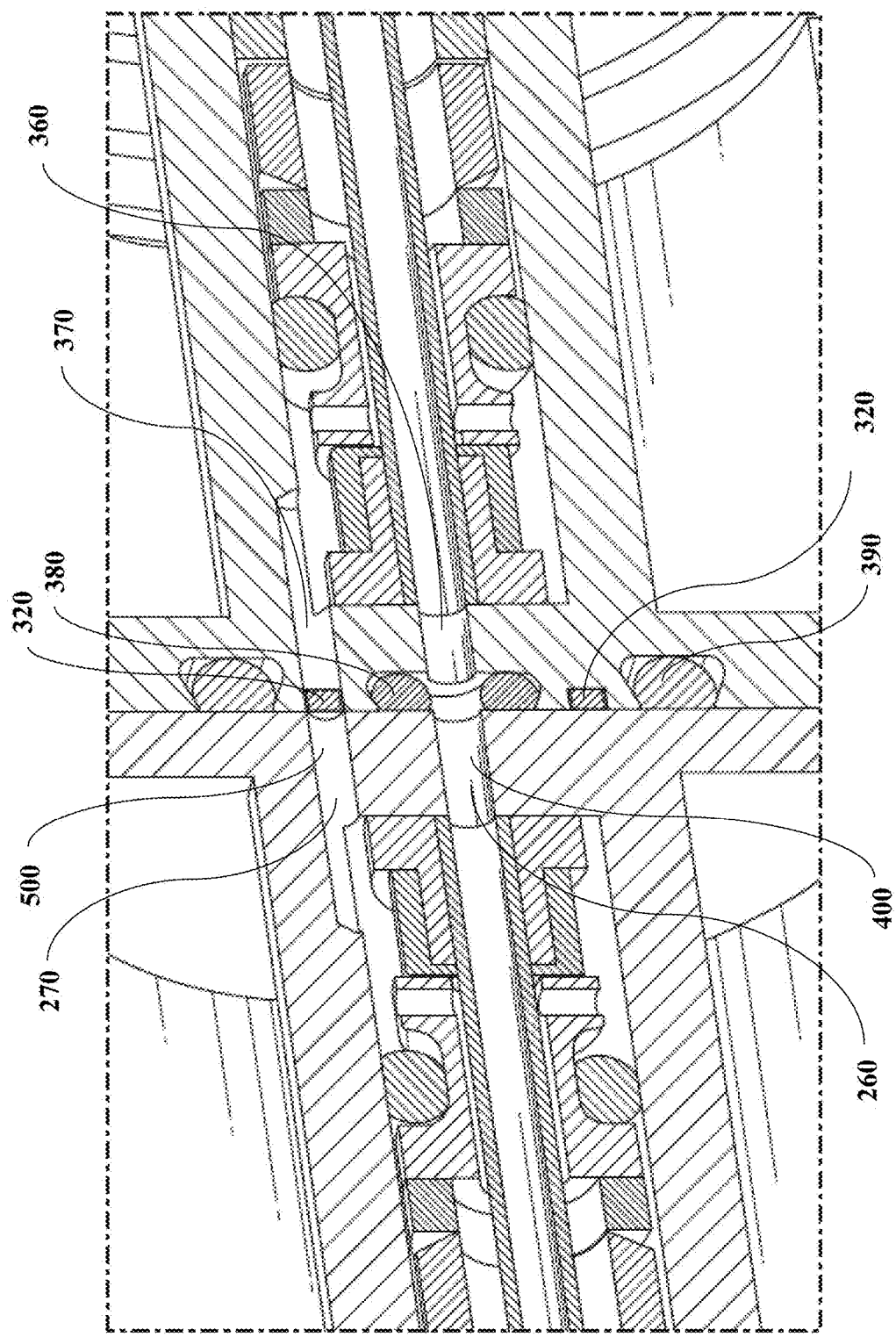
FIG. 4 illustrates an enlarged cutaway view of a connection portion of the fluid connector of FIG. 1.

As best shown in FIGS. 2 and 4, in some embodiments, the groove 320 can be provided on the top wall 312 of the second connector 300 between the inner seal 380 and the outer seal 390. The groove 320 can directly abut the bottom wall 212 of the first connector 200 when the fluid connector 100 is assembled, forming a fifth passageway 322. The fifth passageway 322 can ensure that the second passageway 270 of the first connector 200 is always in fluid communication with the fourth passageway 370 of the second connector 300 regardless of relative rotational orientations of the first connector 200 or the second connector 300, ensuring that the second fluid path 500 can always be formed without needing the first connector 200 and the second connector 300 to be in a specific orientation.

In some embodiments, the groove 320 can be a shape of a circle. In other embodiments, the groove 320 can be a shape of a half-circle, a three-fourth circle, or other suitable shapes. Although it is shown that the groove 320 can be provided on the second connector 300, it can be appreciated that a similar groove can also be provided on the first connector 200, in addition to or instead of the groove 320. Moreover, additional geometry features such as a funnel groove and pin can also be utilized to guide the first connector 200 and the second connector 300 if a specific orientation is necessary due to a specific implementation.

In some embodiments, either the first connector 200, the second connector 300, or both, can be coupled to a flexible external component, to ensure that one component is floating or flexible, so that when the other component is approaching the floating component, the floating component can move and be positioned to match up with the incoming connector to make a connection. For example, in FIG. 3, the second conduit 620 can be flexible (such as a hose or a pipe). In embodiments where at least a portion of the second conduit 620 protrudes out of a rigid component (such as the source vessel 900), the flexibleness of the second conduit 620 can allow the second connector 300 to float in suspense, such that the second connector 300 can more easily mate with the first connector 200. As can be appreciated, same principle can likewise be applied to the first connector 200.

Figure 5:
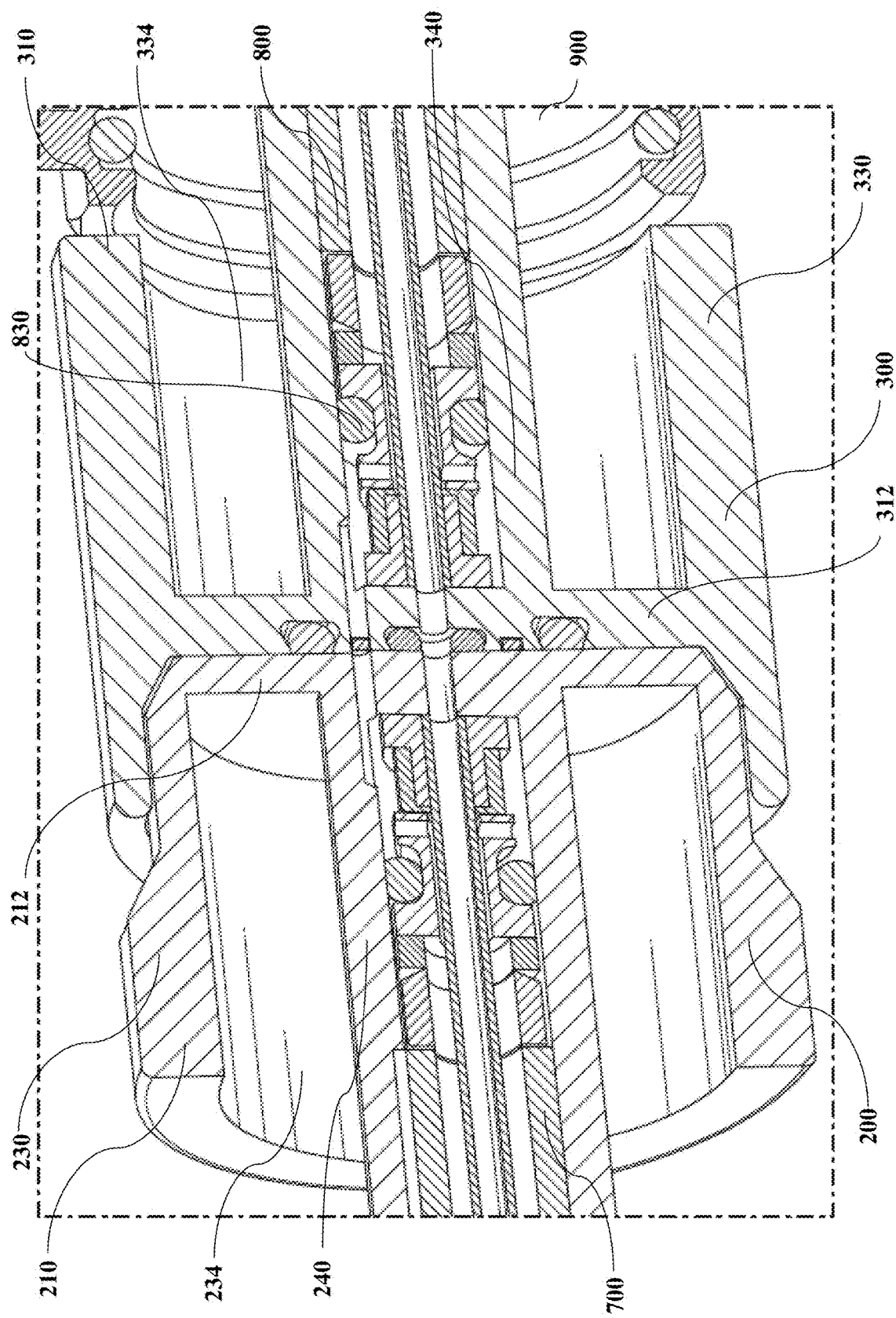
FIG. 5 illustrates another cutaway view of the fluid connector of FIG. 1.
Figure 6:
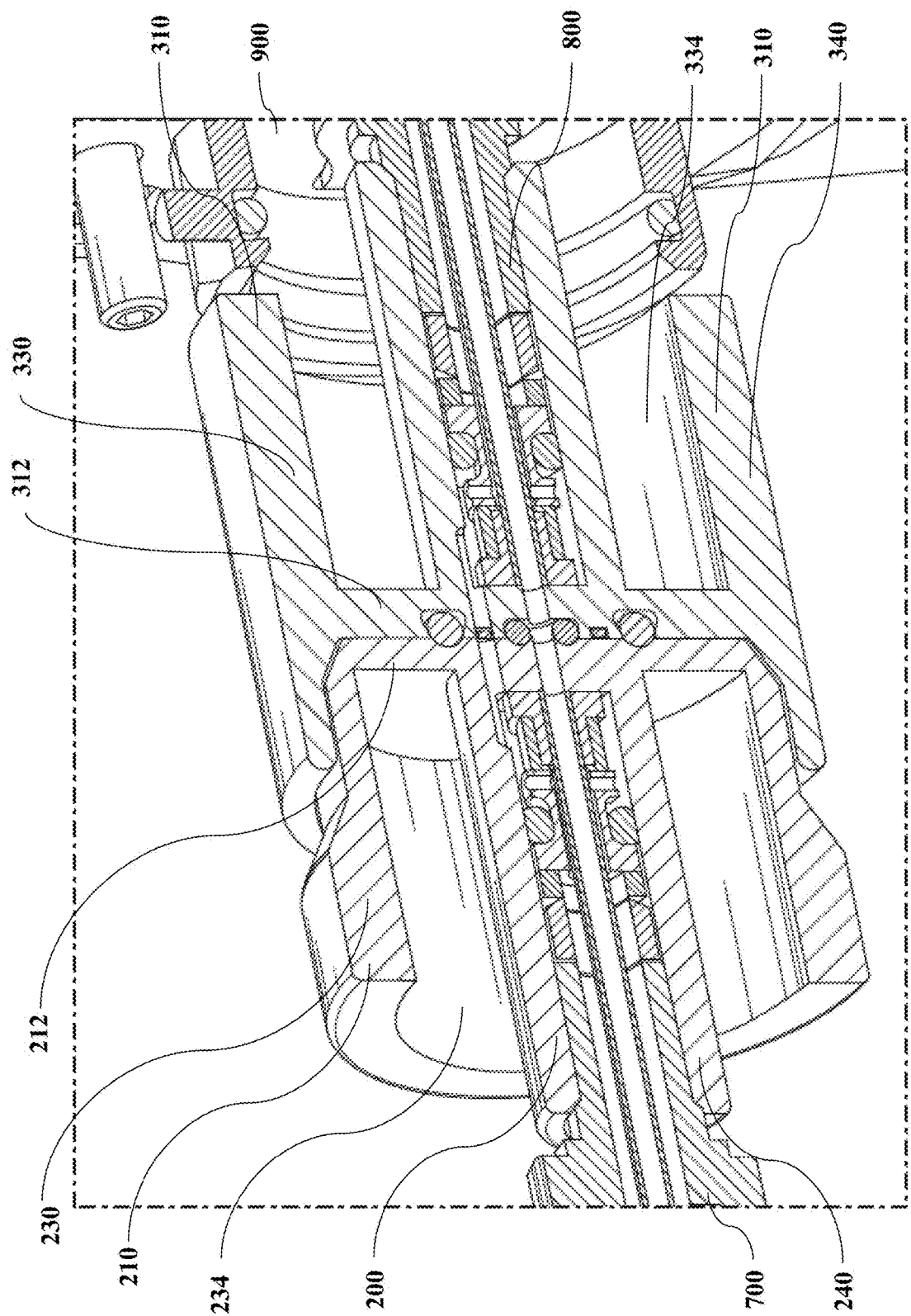
FIG. 6 illustrates another cutaway view of the fluid connector of FIG. 1.

Referring to FIGS. 5 and 6, connections between the first connector 200 and the second connector 300, and between the second connector 300 and the source vessel 900 are illustrated in more detail. A first chamber 234 can be defined by the first outer wall 230, the first inner wall 240, and the base wall 212. A second chamber 334 can be defined by the second outer wall 330, the second inner wall 340, and the top wall 312.

The first magnet 232 can be provided in the first chamber 234 of the first connector 200 and the second magnet 332 can be provided in the second chamber 334 of the second connector 300. Alternatively or additionally, portions of the first connector 200 and/or the second connector 300 (such as the first outer wall 230 and/or the second outer wall 330, and/or the base wall 212 and/or the top wall 312) can be constructed out of a magnetic or ferromagnetic material.

In some embodiments, the first magnet 232 and the second magnet 332 can each be one or more ring magnets. Ring magnets can be beneficial in self-aligning concentric fluid passages. Nonetheless, shapes of the first housing 210 and the second housing 320 can further aid to align the first connector 200 with the second connector 300 to a correct tolerance.

Figure 7:
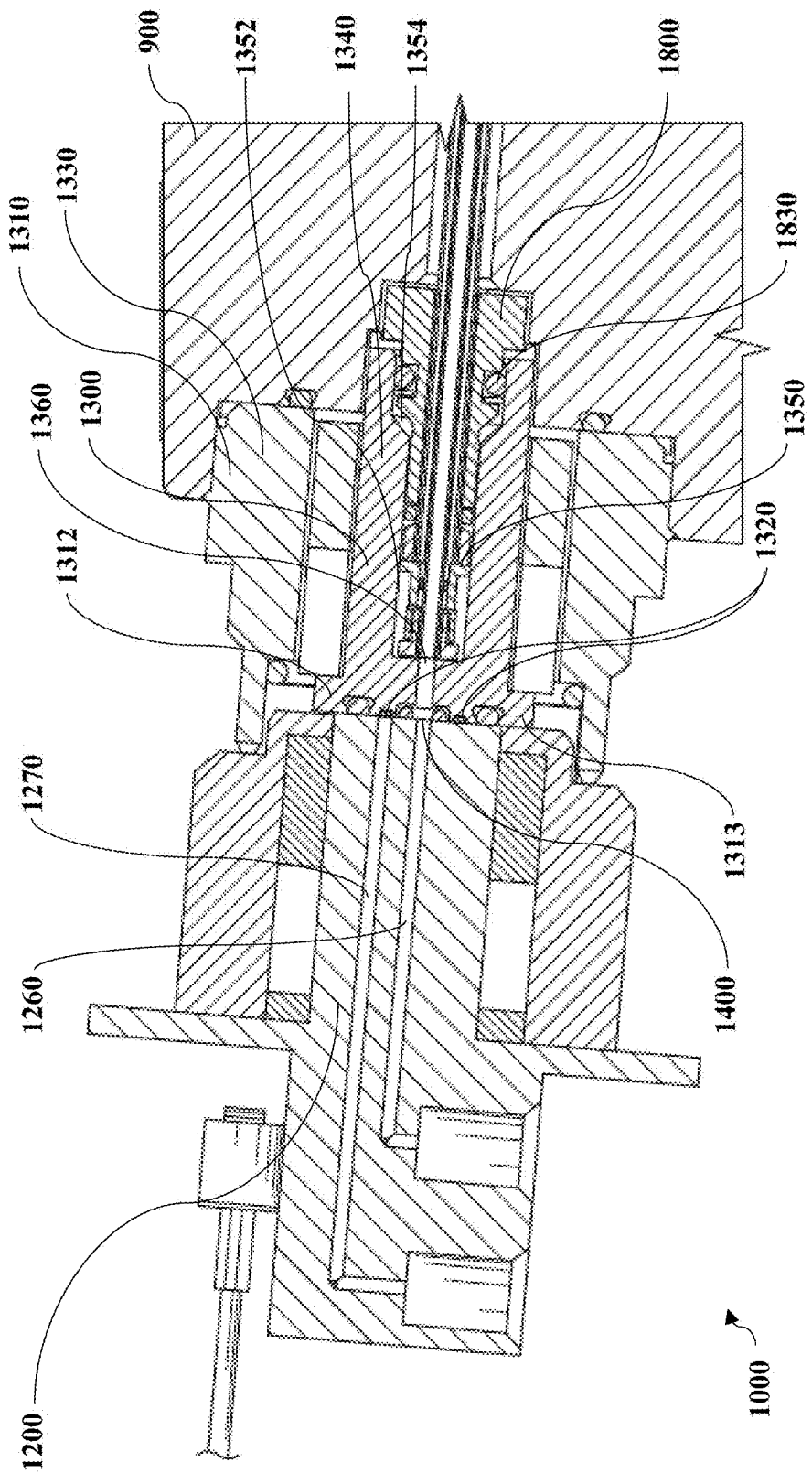
FIG. 7 illustrates a cutaway view of a fluid connector according to another embodiment.

FIG. 7 illustrates a fluid connector 1000 according to another embodiment. In this embodiment, a second connector 1300 can be connected to and protrude from a component such as the source vessel 900. In some embodiments, the second connector 1300 can be a part of the source vessel 900. In other embodiments, the second connector 1300 can be an attachment attached on to the source vessel 900.

The second connector 1300 can have a modified housing different from the second housing 310. Specifically, in a third housing 1310, a top wall 1312 and an inner wall 1340 can be provided separately from an outer wall 1330. Thus, as shown in FIG. 7, the outer wall 1330 is detached and separate from the base wall 1312 and the inner wall 1340. In some embodiments, the outer wall 1330 can be made of a different material as the inner wall 1340. For example, the outer wall 1330 can be made of steel or lead, though other materials are also contemplated.

In this embodiment, the inner wall 1340 can protrude from the top wall 1312 proximal to a center portion of the top wall 1312. However, portions of the top wall 1312 can extend beyond the inner wall 1340, forming a flange 1313.

The inner wall 1340 can further define a second tube 1350 within the second connector 1300. The second tube 1350 can include a second outer tube 1352 and a second inner tube 1354. The second outer tube 1352 and the second inner tube 1354 can have different diameters.

In some embodiments, a second threaded coupling 1800 can be coupled to the second connector 1300 by being inserted into the second tube 1350. The second threaded coupling 1800 can include a second coupling seal 1830 (such as an O-ring) that can seal an inner diameter of the inner wall 1340. A flow path can be provided in a diameter (such as the inner diameter) of the seal to allow venting. Unlike the second coupling seal 830 shown in some embodiments of FIGS. 1-6 however, the second coupling seal 1830 can be provided on a threaded nut further back on the second threaded coupling 1800, which can result in a length reduction of the second connector 1300 and prevent having to push the second coupling seal 1830 over some threads, which can add to manufacturing difficulties.

Further still, in FIG. 7, a first connector 1200 is illustrated in a form of a connector without concentric pathways. The first connector 1200 can include a first passageway 1260 and a second passageway 1270. As before, a third passageway 1360 can be provided through the top wall 1312 such that the second tube 1350 and/or one or more components therein can be in fluid communication with an external component (such as the first connector 200), or with an external environment. The third passageway 1360 can be provided proximal to a central axis through the second connector 1300. Specifically, a location that the third passageway 1360 is provided on the top wall 1312 can correspond with a location that the first passageway 1260 is provided on the first connector 1200, such that when the first connector 1200 and the second connector 1300 are mated together, the first passageway 1260 is in fluid communication with the third passageway 1360, forming a first fluid path 1400.

As before, a groove 1320 can be provided on the top wall 1312, which can function as a fluid path that can be in fluid communication with the second passageway 1270. The groove 1320 can be a shape of a circle. In other embodiments, the groove 1320 can be a shape of a half-circle, a three-fourth circle, or other suitable shape.

Figure 8:
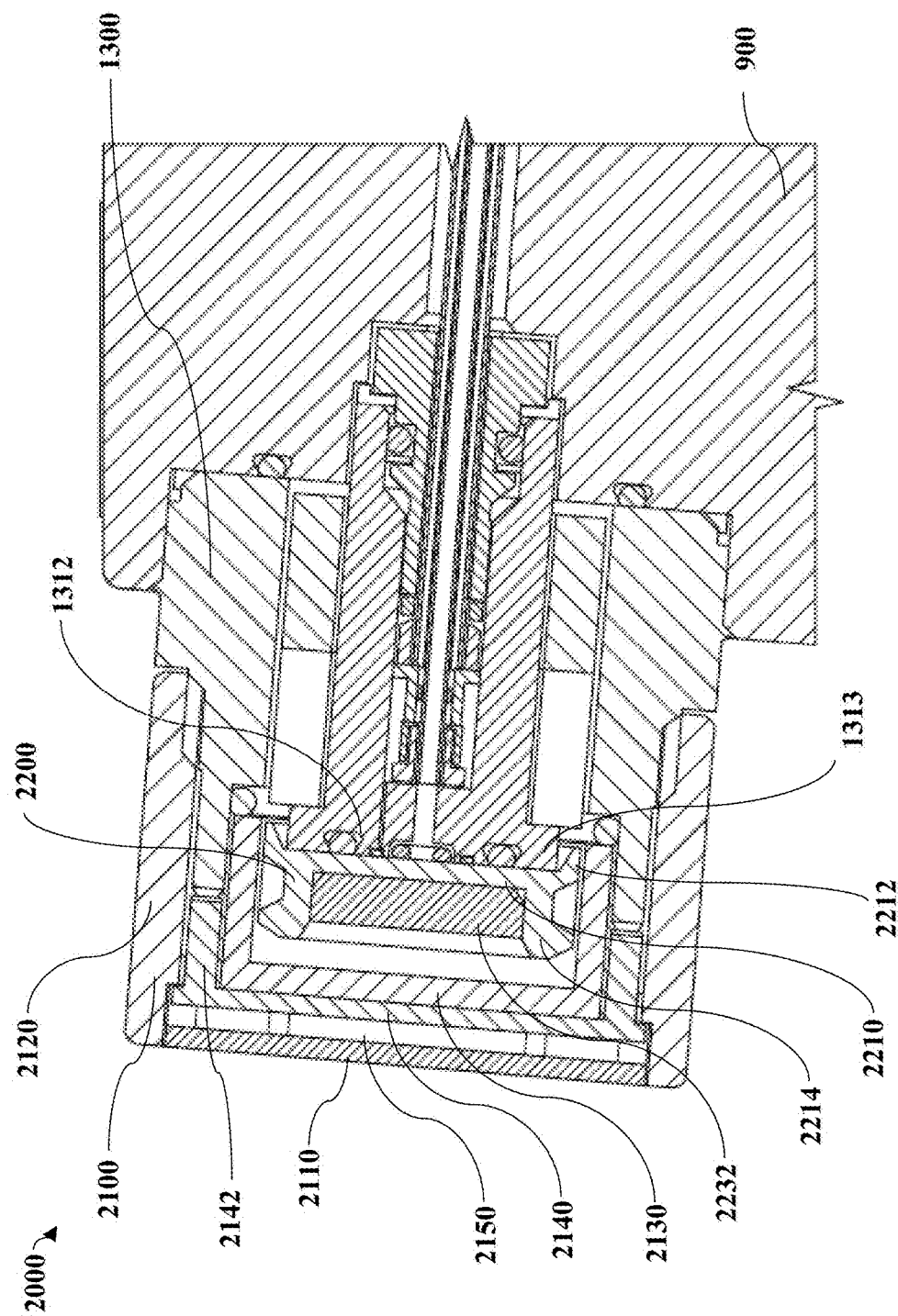
FIG. 8 illustrates a cutaway view of the fluid connector of FIG. 7 with a cap installed thereon.
Figure 9:
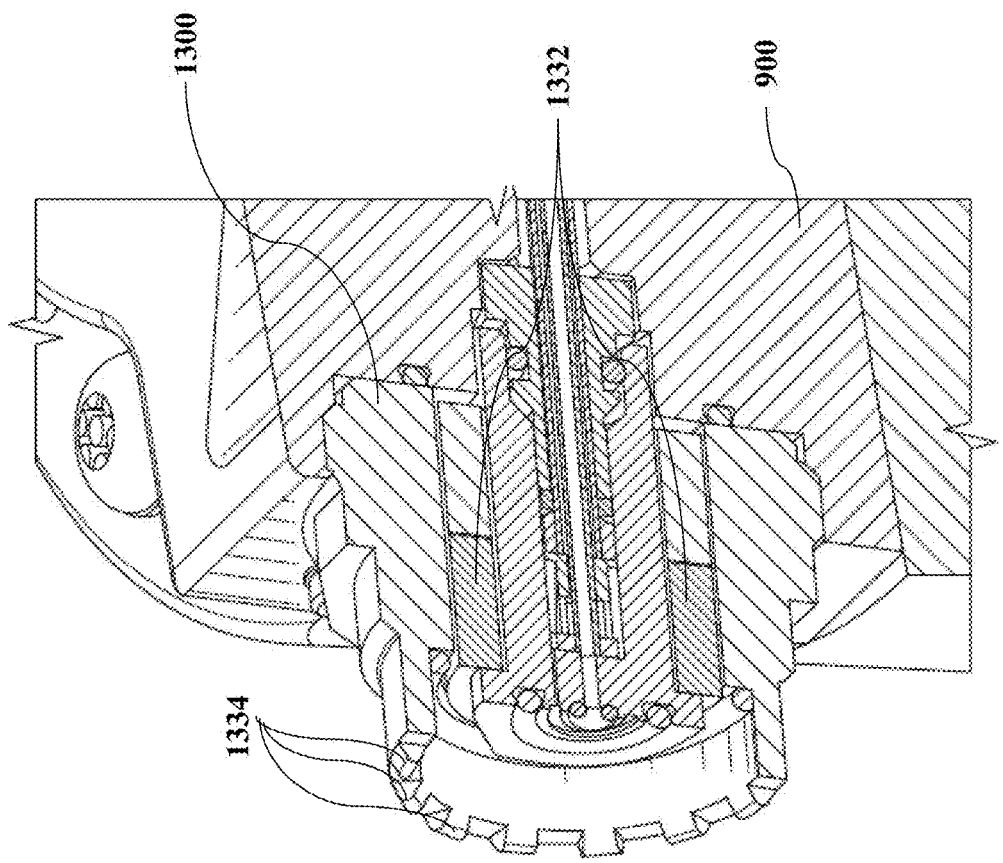
FIG. 9 illustrates another cutaway view of the fluid connector of FIG. 8 with the cap removed.
Figure 9:
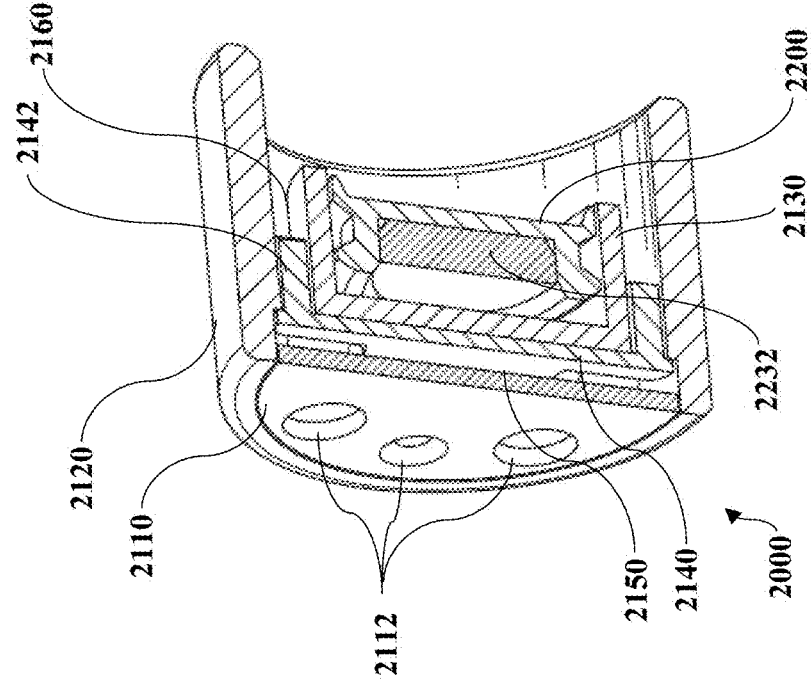
Figure 10:
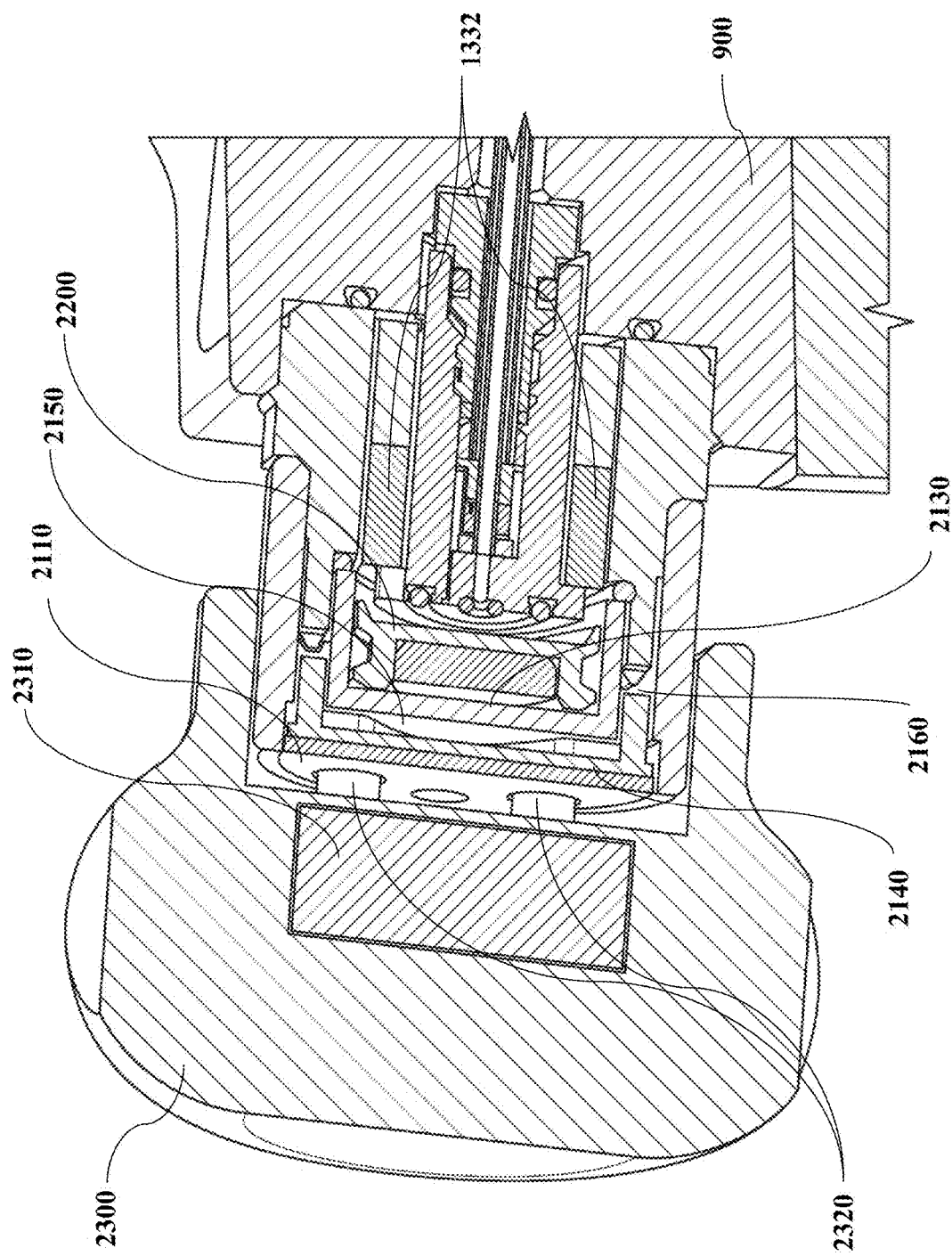
FIG. 10 illustrates another cutaway view of the fluid connector of FIG. 8 together with a cap removal tool according to an embodiment.

FIGS. 8-10 illustrate the second connector 1300 of FIG. 7 together with a cap 2000 and a cap removal tool 2300. As best shown in FIG. 9, the cap 2000 can include an outer cap 2100 and an inner cap 2200.

The outer cap 2100 can include a top wall 2110 surrounded by an outer wall 2120. The top wall 2110 can be substantially circular in shape, and the outer wall 2120 can be provided perpendicular to the top wall 2110, forming generally a tube shape capped by the top wall 2110 on one end. One or more apertures 2112 (see FIG. 9) can be provided on the top wall 2110 to engage the cap removal tool 2300.

The inner cap 2200 can include a base wall 2210 that can abut the top wall 1312 of the second connector 1300 when the cap 2000 is mated with the second connector 1300, which can then form a hermetic seal. The base wall 2210 can include a protrusion 2212 toward the second connector 1300 such that the protrusion 2212 can overlap with a portion of the flange 1313. Moreover, a sidewall 2214 can protrude from the base wall 2210 in a direction opposite the protrusion 2212. The sidewall 2214 together with the base wall 2210 together can define a cavity 2216 that can receive a magnet 2232 therein. A side of the magnet 2232 proximal to the second connector 1300 can have an opposite polarity as a proximal side of a second magnet 1332 provided within the second connector 1300, such that the inner cap 2200 can be attracted onto the second connector 1300 when the inner cap 2200 is within close proximity to the second connector 1300.

The outer cap 2100 can include an enclosure 2130 that surrounds the inner cap 2200 on all but one side. The inner cap 2200 can have a loose fit within the enclosure 2130. A latch 2140 can further surround the enclosure 2130 on three sides. A first gap 2150 can be provided between the top wall 2110 and the enclosure 2130 such that the latch 2140 can be moveable laterally within the first gap 2150. A second gap 2160 can be provided between the outer wall 2120 and the enclosure 2130, with one or more leg portions 2142 of the latch 2140 sandwiched in between. The second gap 2160 can be shaped and positioned to receive the outer wall 1330 of the second connector 1300.

The latch 2140 can be made out of ferrous material such that the latch 2140 can remain attached to the inner cap 2200 due to the magnet 2232, until the latch 2140 is unlatched by a stronger magnet within the cap removal tool 2300. The latch 2140 can include one or more legs 2142, where a bottom edge of the legs 2142 can be chamfered that allow the latch 2140 to ratchet over one or more teeth 1334 on a top edge of the outer wall 1330, while preventing the cap 2000 from being turned back off unless the latch 2140 is unlatched.

The cap 2000 thus can have a double seal, such as through the outer cap 2100 and the inner cap 2200, with a retaining mechanism that prevents accidental removal or single-point failures. In some further embodiments, the outer cap 2200 can be threaded.

As best shown in FIG. 10, the cap removal tool 2300 can include a magnet 2310 therein that can pull on the latch 2140 and the magnet 2232 within the inner cap 2100. A side of the magnet 2232 proximal to the cap 2200 can have an opposite polarity as a side of the magnet 2232 proximal to the cap removal tool 2300, thus the two magnets can attract each other when in close proximity. In some embodiments, the magnet 2310 of the cap removal tool 2300 can be stronger than the second magnet 1332 provided within the second connector 1300. As such, the cap removal tool 2300 can simultaneously disengage the inner cap 2100 and the outer cap 2200, making the process quick and easy for the user.

Moreover, the cap removal tool 2300 can further include one or more pins 2320 that can engage the apertures 2112 of the cap 2000 to torque the cap 2000 away from the second connector 1300.

Figure 11:
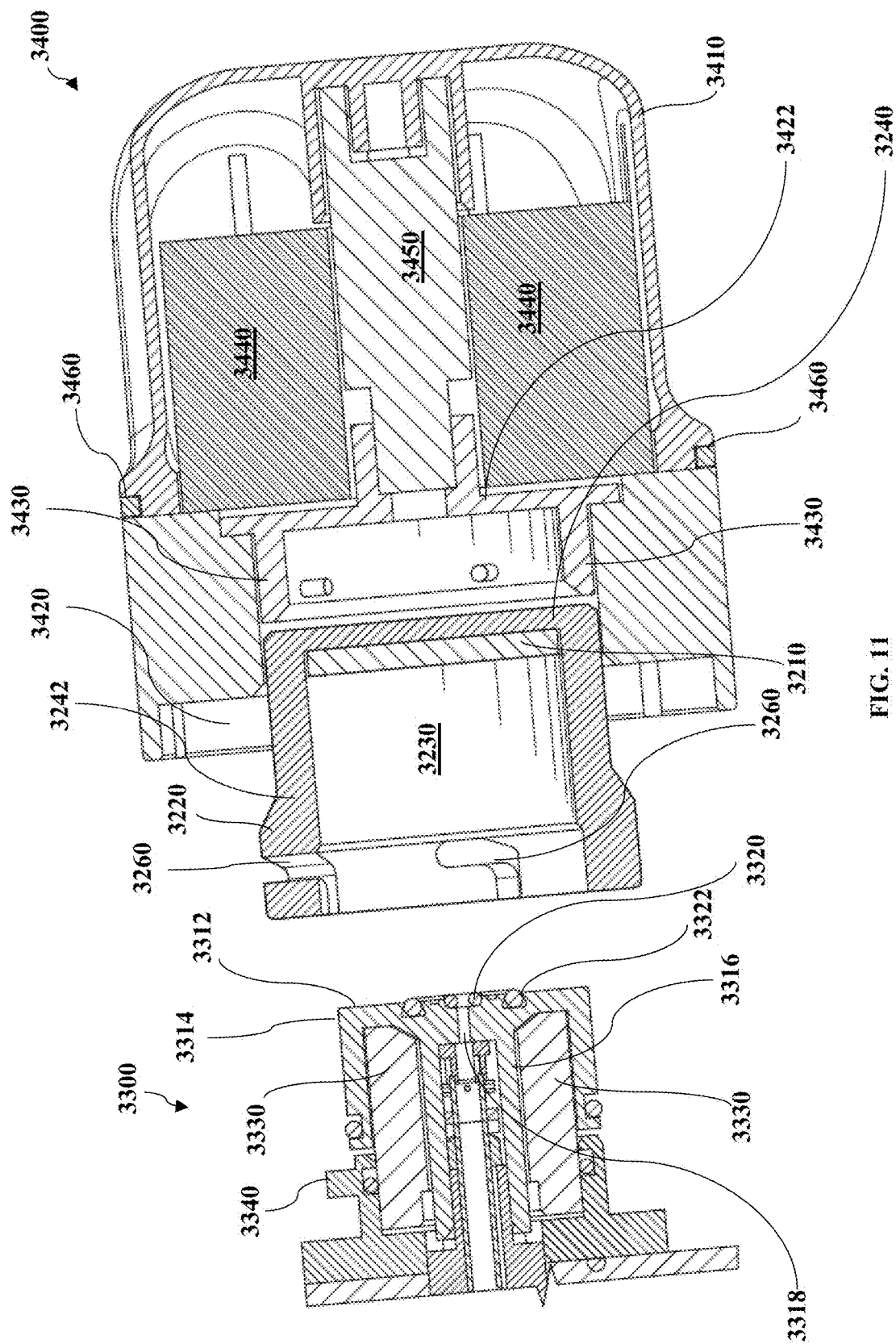
FIG. 11 illustrates a cutaway view of a cap in a first configuration according to another embodiment.
Figure 12:
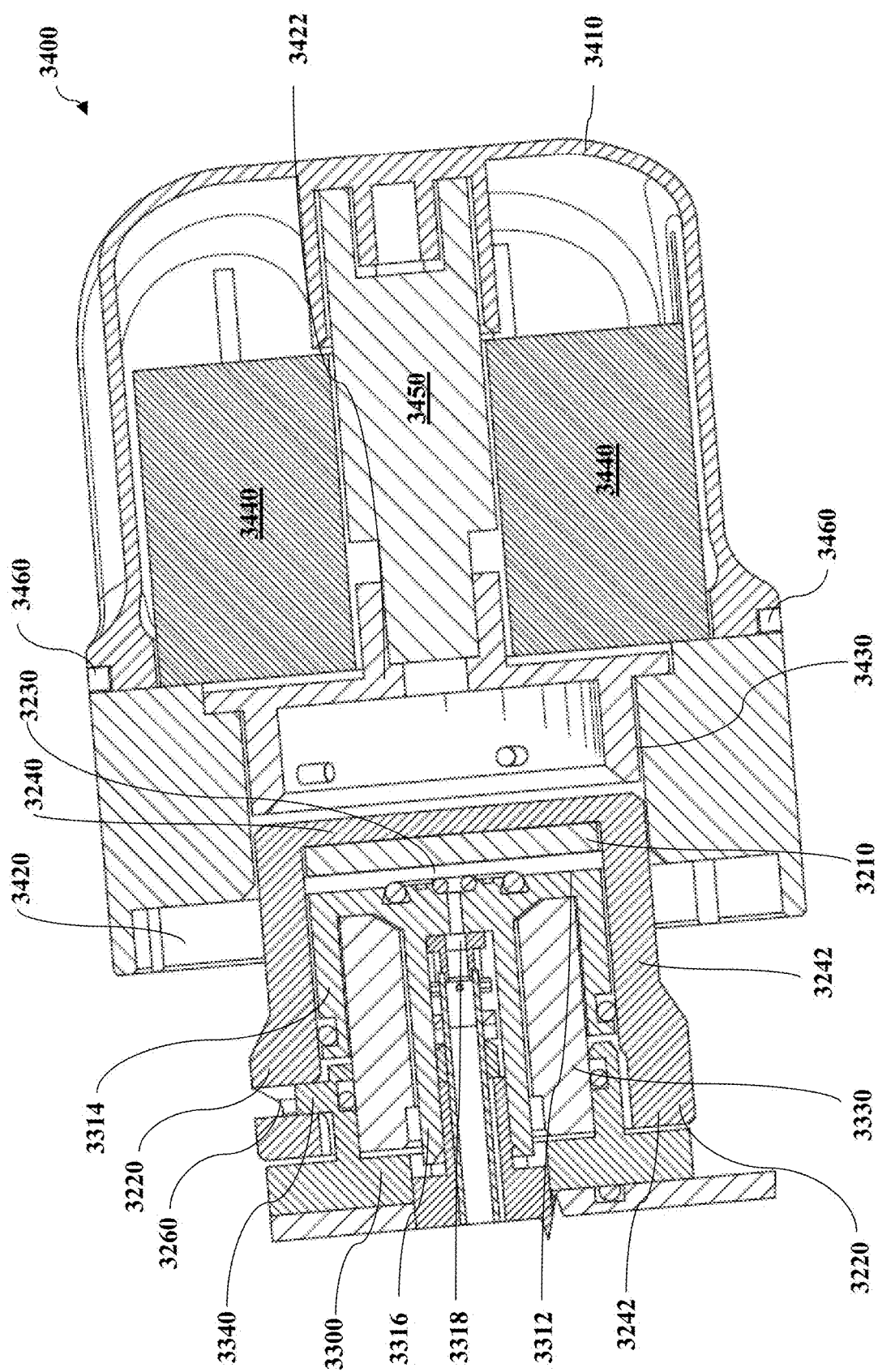
FIG. 12 illustrates a cutaway view of the cap of FIG. 11 in a second configuration.
Figure 13:
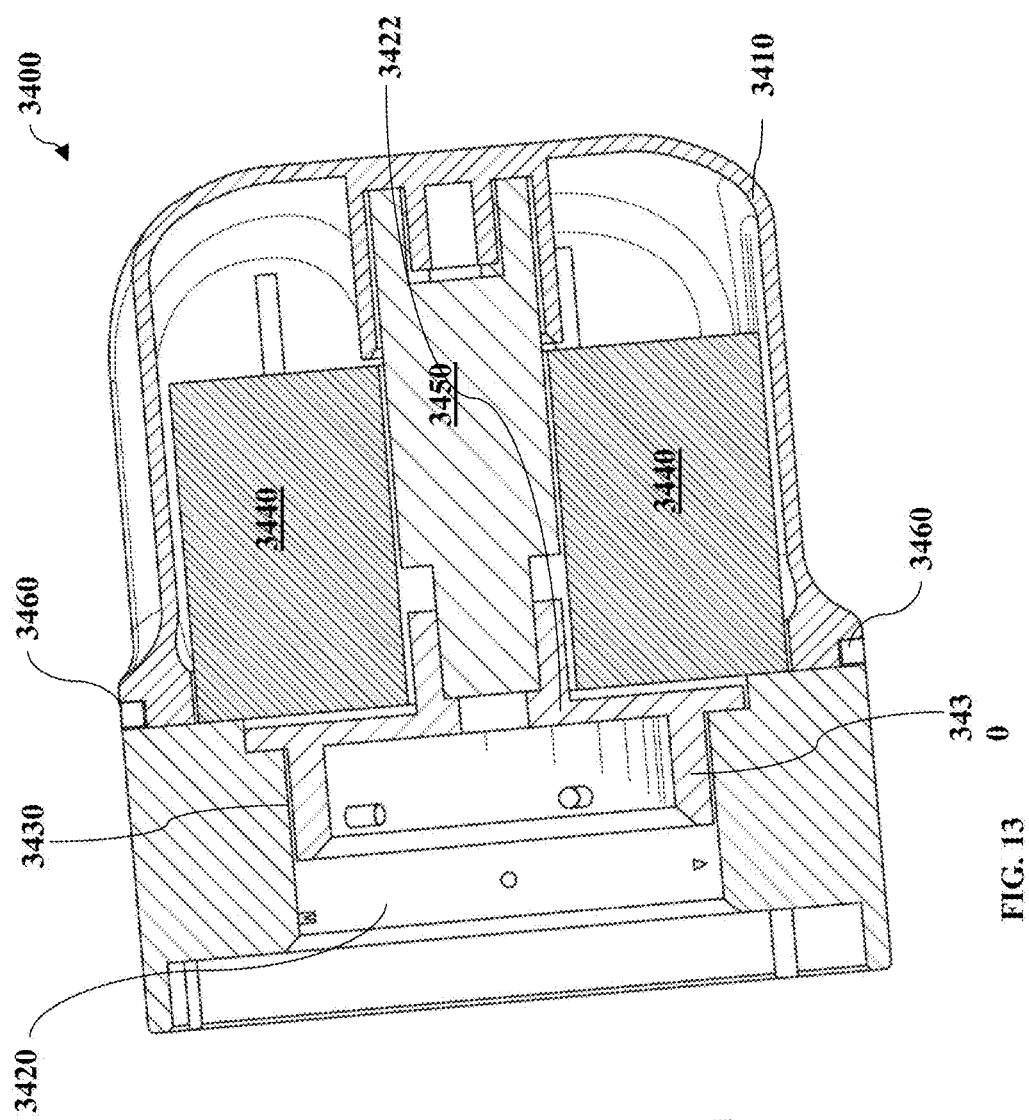
FIG. 13 illustrates a cutaway view of the cap FIG. 11 in a third configuration.
Figure 13:
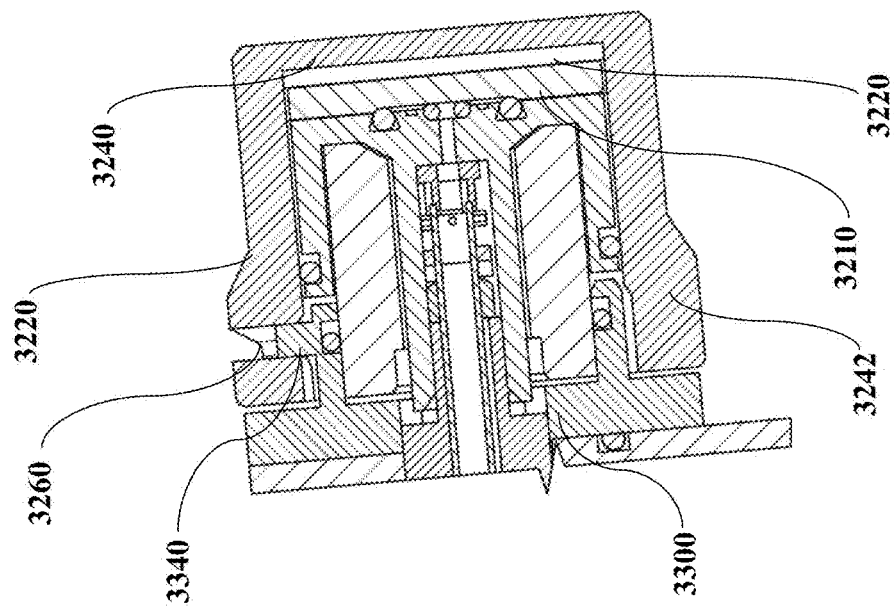

Referring to FIGS. 11-13, a cap 3000 according to another embodiment is provided. As illustrated, the cap 3000 can be used to cap a second connector 3300, which can be functionally similar to the second connector 300 or the second connector 1300. A cap removal tool 3400 can also be provided.

The cap 3000 can include an inner cap 3210 and an outer cap 3220. The inner cap 3210 can be provided in the form of a magnet or a magnetic disk that can act as a first or primary closure or seal. The outer cap 3220 can be provided in the form of tungsten or other similar materials having a magnetic force. The outer cap 3220 can include a first cavity 3230 defined by a first top wall 3240 and a first side wall 3242. The first top wall 3240 can be generally perpendicular with respect to the first side wall 3242 and protrude forward from the first side wall 3242. The first cavity 3230 can act as a "female" connector configured to receive a "male" connector (such as the second connector 3300).

The first side wall 3242 can include one or more grooves (not shown) that can make installing the cap 3000 easier. Moreover, the first side wall 3242 can further include one or more catches 3260 that can engage with one or more notches included on a connection point or line (such as the second connector 3300).

The outer cap 3220 can surround the inner cap 3210 such that the inner cap 3210 can be positioned within the first cavity 3230. The shape of the inner cap 3210 can be defined by the approximate shape of the first cavity 3230. This can help center the inner cap 3210 within the first cavity 3230 so that when the cap 3000 is attached to the second connector 3300, the inner cap 3210 can be centered over a fluid passageway, thereby ensuring the primary seal (i.e., the inner cap) is in the correct location. Further, the inner cap 3210 can have a depth less than the depth of the first cavity 3230. Thus, the first cavity 3230 can still receive a "male" connector therein. In some embodiments, the inner cap 3210 can have a disk shape, though other shapes are also contemplated.

Through the use of magnets of the inner cap 3210 and the magnetic property of the outer cap 3220, the inner cap 3210 can be held concentrically to the outer cap 3220, thereby forming the cap 3000. Thus, when the cap 3000 is not installed on the second connector 3300, the magnetic force of the outer cap 3220 can hold the inner cap 3210 within the first cavity 3230. Thus, once physically proximal to one another, the inner cap 3210 and the outer cap 3220 can self-align through a magnetic force, where the inner cap 3210 can be generally parallel to the first top wall 3240.

The cap 3000 can be used to simultaneously provide a primary seal and a secondary seal on a fluid line or connection (such as the second connector 3300). As such, the cap 3000 can be advantageous over traditional capping systems that include a first cap and a second separate cap that are each individually installed because the inner cap 3210 (i.e., the first cap) and the outer cap 3220 (i.e., the second cap) of this exemplary embodiment can be installed together.

The second connector 3300 can be attached to or part of the source vessel 900 for containing a radioactive fluid, a non-radioactive fluid, a gas, a solid, or any other known material that requires the use of a dual cap. The second connector 3300 can be provided in the form of a "male" connector configured to be received by a "female" connector (such as the first cavity 3230 of the cap 3000 described above). The capping mechanism herein is not limited to the source vessel container shown in the figures but is also contemplated to be used on other types and shapes of vessels.

The second connector 3300 can include a second top wall 3312 and a second side wall 3314 that protrudes rearwardly from the second top wall 3312. The second side wall 3314 can be generally perpendicular with respect to the second top wall 3312. The second connector 3300 can further include a third side wall 3316. The third side wall 3316 can protrude from the second top wall 3312 proximal to a center portion of the second top wall 3312. The third side wall 3316 can be generally parallel with the second side wall 3314. A connector magnet 3330 can be provided between the second side wall 3314 and the third side wall 3316.

The third side wall 3316 can further define a central tube 3318 within the second connector 3300. The central tube 3318 can function as a fluid passageway such that the second connector 3300 can be in fluid communication with an external component or with an external environment. The central tube 3318 can be provided proximal to a central axis through the second connector 3300. The second connector 3300 can further include an inner seal 3320 and an outer seal 3322. The inner seal 3320 can be a first O-ring surrounding the central tube 3318. The inner seal 3320 can serve to isolate an opening of the central tube 3318 from an external component and the ambient environment. The outer seal 3322 can be a second O-ring surrounding the first O-ring (i.e., the inner seal 3320).

Although two seals, 3320 and 3322 are shown, it can be appreciated that, alternatively or additionally, additional seals can be provided on the second connector 3300 to serve similar functions and thus are within the spirit of this disclosure. Further, the size of the inner seal 3320 and/or the outer seal 3322 and the thickness of the second top wall 3312 can vary depending on a compression force asserted against the second top wall 3312.

It is to be further understood that although one fluid passageway provided in the form of the central tube 3318 is shown, additional fluid passageways can be provided on the second connector 3300, and thus are within the spirit of this disclosure. In embodiments where two or more fluid passageways are provided, the inner cap 3210 and the outer cap 3220 provide a primary and secondary seal, respectively, over the two or more fluid passageways just as in the illustrated embodiments.

The second connector 3300 can further include one or more notches 3340. The notches 3340 can be positioned behind the second connector 3300 and extend generally perpendicularly away from the body of the second connector 3300. The notches 3340 can engage with a catch on a cap (such as the catches 3260 of the outer cap 3220 of the cap 3000).

Because the central tube 3318 can be a fluid passageway for radioactive materials, the U.S. Department of Transportation requires the second connector 3300 to have primary and secondary closures (i.e., the inner cap 3210 and the outer cap 3220 of the cap 3000).

In some embodiments, the cap removal tool 3400 can be used to assist in coupling and decoupling the cap 3000 to the second connector 3300. The cap removal tool 3400 can include a housing 3410. The housing 3410 can include a second cavity 3420, where the second cavity 3420 can be defined by a rear wall 3422 and a set of prongs 3430. The prongs 3430 can be generally perpendicular with respect to the rear wall 3422. The second cavity 3420 can be a "female" connector configured to receive a "male" component (such as the cap 3000). The prongs 3430 can be configured to engage with at least a portion of a "male" connector held in the second cavity 3420.

The cap removal tool 3400 can further include one or more tool magnets 3440 and a torque limiter 3450 positioned behind the rear wall 3422 and/or the prongs 3430. Additionally, the cap removal tool 3400 can include a safety ring 3460, concentric to the cap removal tool 3400. Although the safety ring 3460 is shown as positioned around the approximate middle, or center of gravity, of the cap removal tool 3400, the safety ring 3460 can be positioned around any portion of the cap removal tool 3400.

Referring to FIG. 11, in a first configuration, a portion of the cap 3000 can be positioned in the second cavity 3420 of the cap removal tool 3400. The cap removal tool 3400, fits concentrically around the cap 3000. As illustrated, at least a portion of the prongs 3430 can engage with at least a portion of the first side wall 3242 of the cap 3000. As discussed above, the first side wall 3242 can include one or more grooves that can make it easier for the prongs 3430 to grip the cap 3000. The prongs 3430 can allow a user to hold and torque the outer cap 3220 through the movement of the cap removal tool 3400. Because the inner cap 3210, and the outer cap 3220 are coupled, the outer cap 3220 can also be moved with the inner cap 3210.

Still referring to FIG. 11, in the first configuration, the first side wall 3242 of the cap 3000 is generally perpendicular to the rear wall 3422 of the cap removal tool 3400. As such, the inner cap 3210 is also generally parallel to the rear wall 3422. The tool magnets 3440 can exert a magnetic pull on the inner cap 3210, thereby causing the inner cap 3210 to be positioned flush against the first side wall 3242.

As shown in FIG. 12, in a second configuration, the cap 3000 can be placed over at least a portion of the second connector 3300 while the cap removal tool 3400 is still engaged with the cap 3000. In the second configuration, the second connector 3300 can be inserted into at least a portion of the first cavity 3230 of the cap 3000. As shown, the first top wall 3240 of the outer cap 3220 is generally parallel to the second side wall 3314 of the second connector 3300. To secure the outer cap 3220 over the second connector 3300, the catches 3260 can engage with the notches 3340 of the second connector 3300. To position the notches 3340 within the catches 3260, the cap 3000 can be rotated by rotating the cap removal tool 3400 until the catches 3260 line up with the notches 3340.

As discussed above, the cap removal tool 3400 can include a torque limiter 3450. The torque limiter 3450 can be provided in the form of a friction type, a shear pin type, a ball or roller type, a magnetic type, a ratchet type, or any other known torque limiter in the art. Further, the torque limiter 3450 can limit torque in one direction when the cap removal tool 3400 is rotated in a first direction and not apply torque when the cap removal tool 3400 is rotated in a second, opposite, direction. For example, in an exemplary embodiment where the torque limiter 3450 can be provided in the form of a ratchet type torque limiter, the torque limiter 3450 may ratchet in the second direction instead of applying torque. Alternatively, the torque limiter 3450 can limit torque in either direction so that no matter which direction the cap removal tool 3400 is rotated, the torque is limited.

The cap removal tool 3400 can further include a switch (not shown) for determining the torque direction. In a first position, the switch can cause the torque limiter to limit torque in the first direction and not limit torque in the second direction. In a second position, the switch can cause the torque limiter to limit torque in the second direction and not limit torque in the first direction (i.e., flip the direction of torque). In a third position, the switch can cause the torque limiter 3450 to not limit torque in either direction.

Finally, as shown in FIG. 13, to complete the seal between the cap 3000 and the second connector 3300, the cap removal tool 3400 can be disengaged from the cap 3000. Once the cap removal tool 3400 is disengaged from the cap 3000, the connector magnet 3330 can pull the inner cap 3210 towards the second connector 3300 because the magnetic force between the inner cap 3210 and the connector magnet 3330 can be stronger than the magnetic force between the inner cap 3210 and the outer cap 3220. Thus, as shown in FIG. 13, because the inner cap 3210 is flushed with the second top wall 3312, the inner cap 3210 may not contact the first top wall 3240 of the outer cap 3220. Put differently, the inner cap 3210 can be moveable within the first cavity 3230.

Thus, the inner cap 3210 can form a first or primary seal over the fluid flow path of the central tube 318 without user interaction. The inner cap 3210 may seal both fluid and vent pathways of the second connector 3300. The outer cap 3220 can then form a second or secondary seal over the inner cap 3210, as required by the U.S. Department of Transportation Type A shipping requirements. Thus, the cap 3000 can be advantageous over traditional capping systems that include a first cap and a second separate cap that are each individually installed because a first and second seal can be formed in one step. Thereby reducing the interaction time and effort for a user.

The safety ring 3460 of the cap removal tool 3400 can provide further safety advantages. If the cap removal tool 3400 is dropped during installation of the cap 3000, the safety ring 3460 can ensure the cap removal tool 3400 does not fall out of reach of the user. The safety ring 3460 can include a tether (not shown) connected to an anchor point, such as the second connector 3300 or another machine or piece of equipment so that if the user drops the cap removal tool 3400, the tether catches the cap removal tool 3400. Because the safety ring 3460 can be concentric to the cap removal tool 3400, the safety ring 3460 can allow the cap removal tool 3400 to rotate freely for ease of use but can prevent lengthwise movement of the cap removal tool 3400. In an exemplary embodiment as shown in FIG. 13, because the safety ring 3460 is positioned around the approximate middle, or center of gravity, of the cap removal tool 3400, if the cap removal tool 3400 is dropped, the cap removal tool 3400 may be suspended in a relatively flat position. However, it is to be understood that the safety ring 3460 can be positioned anywhere on the cap removal tool 3400 to meet the needs of the system.

To remove the cap 3000 from the second connector 3300, in an exemplary embodiment, the cap removal tool 3400 is once again engaged with the cap 3000. A user can position the cap removal tool 3400 around the outer cap 3220 by re-engaging the prongs 3430 with the grooves of the first side wall 3242. Once the cap removal tool 3400 is re-engaged, the tool magnets 3440 can cause the inner cap 3210 to break the seal with the fluid flow path of the central tube 3318 because the tool magnets 3440 may exert a stronger force than the connector magnet 3330 when the cap removal tool 3400 is engaged with the cap 3000. Finally, to remove the cap 3000, the user can turn the cap removal tool 3400, thereby also turning the cap 3000, until the catches 3260 become disengaged with the notches 3340. Once the catches 3260 are free, the user may pull the cap removal tool 3400 and, subsequently, the cap 3000 away from the second connector 3300.

In another embodiment, the cap 3000 can be applied to the second connector 3300 with a self-locking outer cap 3220. Here, the second connector 3300 can include one or more grooves in addition to or in place of the catches 3260, and the outer cap 3220 can include magnetic latches in addition to or in place of the catches 3260. Thus, the magnetic latches can engage with the grooves of the second connector 3300 and may not be disengaged without the use of the cap removal tool 3400.

Specific embodiments of a fluid connector according to the present invention have been described for the purpose of illustrating the manner in which the invention can be made and used. It should be understood that the implementation of other variations and modifications of this invention and its different aspects will be apparent to one skilled in the art, and that this invention is not limited by the specific embodiments described. Features described in one embodiment can be implemented in other embodiments. The subject disclosure is understood to encompass the present invention and any and all modifications, variations, or equivalents that fall within the spirit and scope of the basic underlying principles disclosed and claimed herein.

What is claimed is:
1. A fluid connector system comprising:
a connector including a first passageway and a second passageway, the connector comprising a first magnet; and
a cap for capping the connector, the cap comprising:
an outer cap coupled to an inner cap, wherein the inner cap comprising a second magnet,
wherein the cap is attracted to the connector through a magnetic force, thereby capping the connector.
2. The fluid connector system of claim 1 further comprising a cap removal tool for engaging the cap, the cap removal tool comprising a third magnet.
3. The fluid connector system of claim 2, wherein the cap further comprising a latch provided between the outer cap and the inner cap, wherein the latch being moveable relative to the inner cap and the outer cap.
4. The fluid connector system of claim 3, wherein the latch is made of a ferrous material, such that the latch is attracted to the cap removal tool when the cap removal tool engages the cap, and the latch is attracted to the inner cap when the cap removal tool is absent.
5. The fluid connector system of claim 2, wherein the outer cap comprises a catch configured to mate with a notch on the connector, thereby locking the cap onto the connector.
6. The fluid connector system of claim 2, wherein the cap removal tool further comprising a pin for engaging an aperture of the outer cap.

* * * * *